Figure 1:
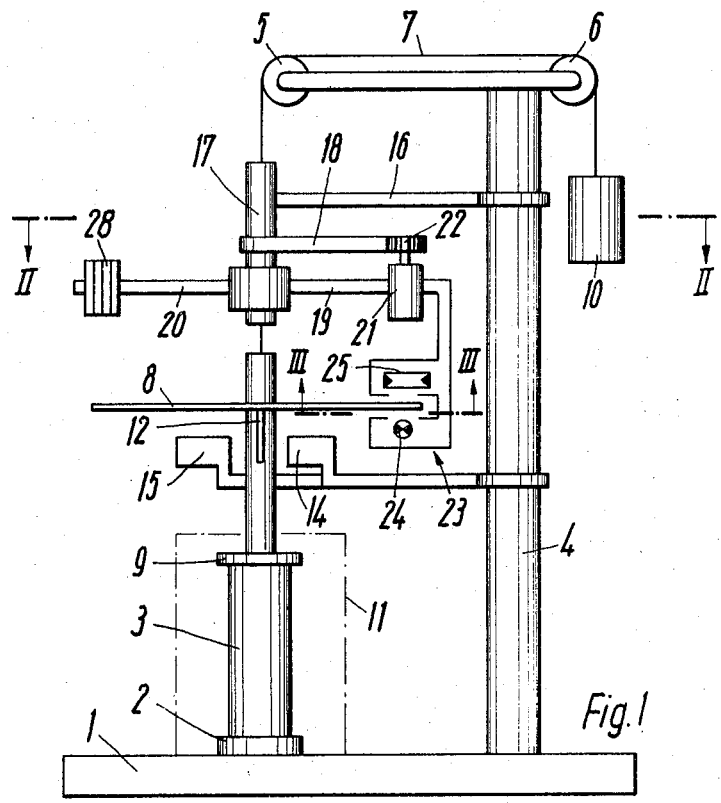

United States Patent

Moser et al.

[15] 3,680,366
[45] Aug. 1, 1972

[54] TORSIONAL OSCILLATION DEVICE

[72] Inventors: Kurt Moser, Freiburg; Beat Hochli, Bern, both of Switzerland

[73] Assignee: Lonza, Ltd., Gampel/Valais (Direction Basel), Switzerland

[22] Filed: Nov. 3, 1970

[21] Appl. No.: 86,461

[52] U.S. Cl. ..................................................73/99
[51] Int. Cl. .............................................G01n 3/32
[58] Field of Search ................................73/99, 15.6

[56] References Cited

UNITED STATES PATENTS 3,501,952  3/1970  Gergen et al..................73/99 X

*Primary Examiner*—Jerry W. Myracle
*Attorney*—Brady, O'Boyle & Gates

[57] ABSTRACT

A torsional oscillation device for testing plastics materials having a first clamp for gripping one end of a plastics material sample in a tempering chamber, and a second clamp for gripping the other end of the sample and rigidly connected to an oscillation body. The oscillation body, second clamp and the sample form a torsion pendulum in which oscillations are produced by a means through the oscillation body and a light transducer through a window in the oscillation body produces an electrical signal whose magnitude is dependent on the position of the oscillation body. The output of the transducer is connected to the actual-value input of a variable gain amplifier in a control device that drives a servo-motor which pivots the first clamp about the torsion pendulum axis. The nominal-value input of the control device corresponds to a predetermined relative position of the oscillation body and the part of the transducer not taking part in the pendulum oscillations.

4 Claims, 4 Drawing Figures

PATENTED AUG 1 1972

3,680,366

SHEET 1 OF 2

Inventors
KURT MOSER
BEAT HÖCHLI
BY Brady, O'Boyle & Gates
ATTORNEYS

Inventors
KURT MOSER
BEAT HÖCHLI

3,680,366

TORSIONAL OSCILLATION DEVICE

This invention relates to a torsional oscillation device for testing plastics materials, having a first gripping clamp for holding one end of a plastics material sample and a second gripping clamp, rigidly connected to an oscillation body, for the other end of the plastics material sample, a tempering chamber for the gripped plastics material sample, a device for the excitation of free oscillations in the torsion pendulum formed by the oscillation body and the plastics material sample, and a transducer for producing an electrical signal, the magnitude of which is dependent on the position of the oscillation body.

Devices such as that referred to above are used for determining the shear modulus of plastics materials, the period of oscillation of the pendulum formed by the oscillation body and the plastic sample being measured, and the shear modulus being calculated from the period of oscillation, the moment of inertia of the oscillation body with the second gripping clamp, and the dimensions of the sample. During the measurements the plastics material sample is kept at a specific temperature in the tempering chamber. The measurements are taken at various temperatures, since the variation of the shear modulus with temperature is of interest.

In a known device of this type ("Plastics and Polymers," 37, 1969, No. 131, pp. 469–474), the transducer consists of a light source and a photo-cell, and the oscillation body is a bar carrying weights at its ends which darken the photo-cell in the zero position of the oscillations. The electrical impulses arising during oscillation of the pendulum are fed to an electronic device in order to determine automatically the period of oscillation.

With devices which in place of the transducer and the electronic device have a device for recording the pendulum oscillation ("Kunstoffe," Vol 57, 1967, No. 4, pp. 257–264), the damping (internal friction) of the plastic can be determined in addition to the shear modulus.

One difficulty in making such torsional oscillation tests is that the plastics material sample gradually turns (twists) during tests made over a wide temperature range, so that the zero point of the oscillation gradually shifts by an amount which is not negligible in relation to the applied oscillation amplitude, and may even be greater than this. This type of zero-point shift leads to measuring errors if the half oscillation-period is determined from two successive zero passages, or if it is determined from one zero passage and the next but one, and the damping is appreciable. If the shift in the zero point of the oscillation exceeds its amplitude, then measurement is no longer even possible, and the series of tests must be disconnected.

It is an object of the present invention to mitigate these disadvantages and to enable not only the period of oscillation but also the damping to be automatically determined, without an oscillogram having to be taken and evaluated.

According to the invention the first gripping clamp or the part of the transducer not taking part in the pendulum oscillation is pivotable by a servo-motor about the pendulum axis, and the electrical output of the transducer is connected to the actual-value input of a variable gain amplifier supplying the servo-motor, in a control device, whose nominal-value input-magnitude corresponds to a predetermined relative position, lying in the operating range of the transducer, of the oscillation body and the part of the transducer not taking part in the pendulum oscillations.

Figure 2:
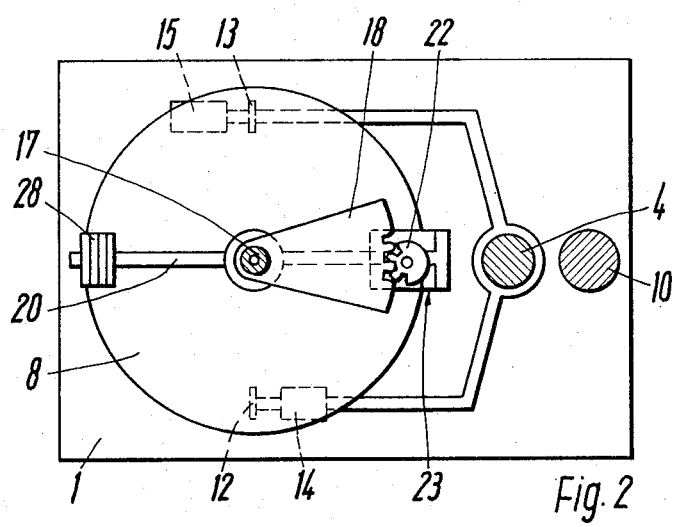
Figure 3:
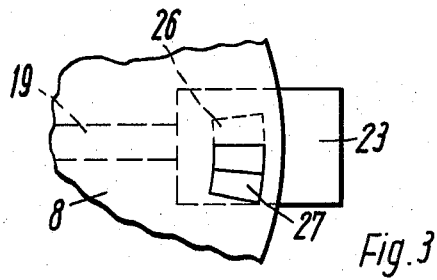
Figure 4:
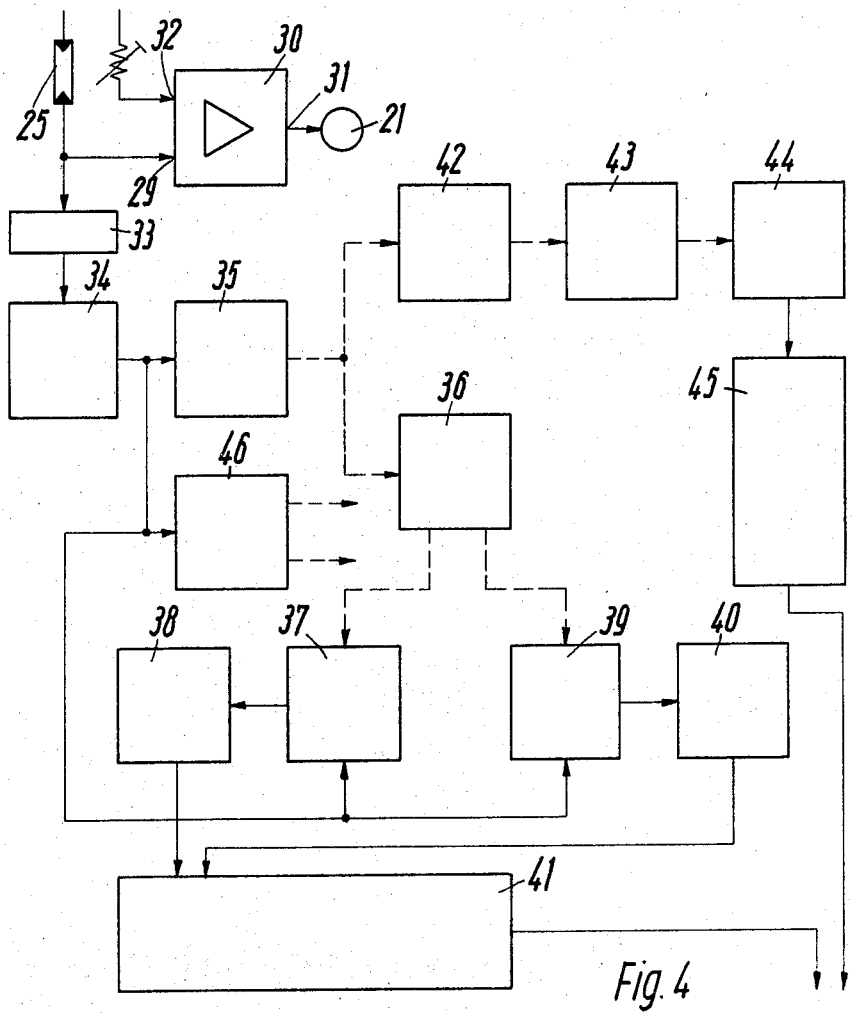

The invention will be more readily understood from the following description of an embodiment of the invention, given by way of example, with reference to the accompanying drawings, in which, FIG. 1 is a side elevational view of the torsion pendulum and the parts of a torsional oscillation device assembled therewith, the view being partly schematic FIG. 2 is a cross section view on the line II—II in FIG. 1, FIG. 3 is an enlarged fragmentary sectional view taken substantially on the line III—III in FIG. 1, FIG. 4 is a schematic block diagram of a control circuit to compensate for shifts in the zero point of the oscillations of the pendulum in the device in FIG. 1, and a circuit for determining the shear modulus and the damping of a plastics material sample forming part of the pendulum.

As shown in FIGS. 1 and 2 a first gripping clamp 2 for the end of a plastics material sample 3 not taking part in the oscillations is affixed to a base plate 1. On the base plate stands a column 4 carrying at the top two deflector rollers 5 and 6 for a twistable wire 7 substantially free of directing force. At one end of the wire 7 is suspended an oscillation plate 8, fixedly attached to a second gripping clamp 9 for the other end of the sample 3. At the other end of the wire 7 hangs a counterweight 10, which is only slightly heavier than the total weight of the oscillation plate 8 and the second gripping clamp 9. A tempering chamber 11, indicated in dotted lines, surrounds the gripped sample 3, and is equipped with means, not shown, for achieving a temperature controllable according to a program. The oscillation plate 8 carries two soft iron pieces 12 and 13, each corresponding to a fixed solenoid 14 or 15, by whose brief excitation a rotary impulse can be applied to the torsion pendulum 3, 8, 9 in order to induce a damped oscillation in said pendulum.

To one arm 16 from the column 4 there is affixed a sleeve 17 through which the wire 7 passes freely. A toothed segment 18 is fixedly attached to the sleeve 17. A double-armed lever 19, 20 is rotatably affixed by means of a ball bearing on the sleeve 17. An arm 19 of the double-armed lever carries a geared motor (servo-motor) 21. On the driven shaft of this heavily geared down gearing is mounted a cog 22 which meshes with the toothed segment 18. The arm 19 also carries a transducer 23 for producing an electrical signal the magnitude of which is dependent on the momentary position of the oscillation plate 8. This transducer 23 consists of a light source 24 disposed on one side of the oscillation plate, and a photo-resistor 25 or phototransistor (not shown in FIG. 3) disposed opposite the source on the other side of the oscillation plate 8, and with a substantially rectangular aperture 26. Apart from these parts 24, 25, 26 not taking part in the pendulum movements, the transducer includes an aperture 27 in the oscillation plate 8, corresponding to the aperture 26. The other arm 20 of the double-armed lever carries a counterweight 28.

As shown in FIG. 4, the photo-resistance 25 lies in the current circuit of the actual-value input 29 of a variable gain amplifier 30 from whose output 31 the servo-motor 21 is fed. The nominal-value input 32 of the amplifier 30 is supplied with a current which corresponds to the actual value if the aperture 27 in the oscillation plate 8 and the aperture 26 coincide so that with the maximum rotation of the oscillation plate 8, attributable to turning (twisting) of the sample 3, between two successive measurements, the light flux falling on the photo-resistor 25 is neither completely interrupted nor does it reach its maximum value as determined by the apertures 26 and 27, and so that this maximum value is also not reached with the greatest amplitudes of oscillation of the plate 8 which are to be measured. The motor 21 changes its direction of rotation on reversal of direction in the current which supplies the motor. The direction of the output current from the variable gain amplifier 30 depends on the sign of the difference between the nominal and actual values at the amplifier inputs 32 and 29, and the motor 21 is so connected that on deviations of the relative position of the apertures 27 and 26 from the corresponding nominal value, this is again restored. The light source 24 may also be fixed in position provided it illuminates uniformly a sufficiently large area of the plate 8.

The current circuit for the photo-resistor 25 includes an impedance transformer 33, followed by a half-wave rectifier 34. Two of these successively supplied half-waves are converted into rectangular impulses in a threshold value switch (Schmitt trigger) 35. These rectangular impulses control a first bi-stable multi-vibrator (flip-flop) 36, which in one of its two conditions and by means of a first electronic switch 37 causes storage of the amplitude value of a half-wave in a first store 38, and in its other condition and by means of a second electronic switch 39 causes storage of the amplitude value of the second half-wave in a second store 40. The two stored amplitude values are fed to an analog calculator 41 which calculates the damping from these values. Two successive rectangular impulses are also fed to a second bi-stable multi-vibrator (flip-flop) 42 connected to a device (counter 43, converter 44) for measuring the oscillation period, the result being fed to a second calculator 45 which calculates the shear modulus from the oscillation period and the parameters (moment of inertia of the oscillation plate and the parts rigidly affixed thereto, dimensions of the plastic sample) which have been set therein. The damping determined by the calculator 41 and the shear modulus from calculator 45 are displayed on a recording instrument (not shown) together with the temperature of the tempering chamber 11, measured by a device which is not shown. FIG. 4 shows the connections for analog signals in solid lines, and the connections for (binary) logic signals in dotted lines. Restoration of the logic units is effected automatically with the aid of a threshold value switch when an angle of rotation of more than ±3° is exceeded.

In order to measure shear modulus and the damping of the plastic material in relation to temperature, the temperature in the tempering chamber is raised by stages. Whenever a stational temperature value has been reached, the device 29–30 in FIG. 4 is first switched on, in order to set the transducer 23 to its rest position, corresponding to the zero point of the oscillations to be applied, should this be necessary, i.e., if the sample 3 has twisted. The solenoids 14, 15 are then briefly excited in order to cause a damped oscillation of the pendulum. After an oscillation amplitude of less than ±3° has been reached, the logic circuit 42, 43, 36, 37 and 39 (FIG. 4) is switched on, so that the shear modulus and the damping of the sample can be determined from two successive half-waves of the same direction. These procedures are repeated when the next temperature has been reached. A time-controlled programming device, not shown, may be used with advantage.

Instead of the transducer, the first gripping clamp may also be pivotable by the servo-motor about the pendulum axis. This embodiment is simpler in construction, since the servo-motor can then be mounted on a base plate, with the toothed segment close above it. The embodiment in FIGS. 1-3, wherein the transducer can be pivoted about the pendulum axis by means of the servo-motor is of course more complicated in design, but facilitates a construction wherein a tempering chamber, open at the top, can be slid from below over the gripped plastics material sample and the gripping clamps to a chamber cover fixedly disposed above these parts, wherein the lower gripping clamp is firmly affixed to this cover.

We claim:

1. A torsional oscillation device for testing a sample of plastics material, comprising an oscillation body, a first gripping clamp for holding one end of the plastics material sample, a second gripping clamp rigidly connected to said oscillation body for holding the other end of the plastics material sample, heating means for the gripped plastics material sample, said oscillation body and the plastics material sample forming a torsion pendulum having an axis, means to produce free oscillations in the torsion pendulum, a transducer for producing an electrical signal the magnitude of which is dependent on the position of the oscillation body and having a part that does not take part in the pendulum oscillation, a servo-motor connected to pivot said first gripping clamp or the said transducer part about the axis of the torsion pendulum, amplifier means having an actual-value input and a nominal-value input, said amplifier means connected to energize said servo-motor, the electrical signal output of said transducer connected to said actual-valve input, and a control device supplying a control signal to said nominal-value input having a magnitude in the operating range of said transistor that corresponds to a predetermined relative position of said oscillation body and said part of the transistor not taking part in the pendulum oscillations.

2. A device as claimed in claim 5, wherein the transducer comprises a first aperture fixedly connected with the oscillation body and participating in the pendulum movements, and a second aperture which does not participate in the pendulum movements, said first and second apertures partly registering at the nominal values of the control dimensions, a source of illumination on one side of said apertures, and a photo-electric member on the opposite side of said apertures adapted to be illuminated by said source of illumination through the apertures, and said photo-electric member connected with the actual-valve input of said amplifier means.

3. A device as claimed in claim 5, including half-wave rectifier means having a pair of output signals, said transducer connected to said half-wave rectifier means, a bi-stable multi-vibrator having two conditions connected for control by said pair of output signals, first storage means and second storage means connected for control by said bi-stable multi-vibrator which in response to one output signal of said pair is actuated to one of its two conditions to actuate said first storage means and in response to the other output signal of said pair is actuated to the other condition to actuate said second storage means, calculator means, and said first and second storage means connected to feed the signals stored therein to said calculator in order to calculate the damping of the oscillation.

4. A torsional oscillation device as set forth in claim 1, including means for measuring the period of oscillation of said torsion pendulum connected to said transducer, calculator means, and said oscillation period measuring means having an output signal connected to control said calculator means to calculate the shear modulus of the sample of plastics material.

* * * * *

UNITED STATES PATENT OFFICE
CERTIFICATE OF CORRECTION

Patent No. 3,680,366        Dated August 1, 1972

Inventor(s)        KURT MOSER AND BEAT HOCHLI

It is certified that error appears in the above-identified patent and that said Letters Patent are hereby corrected as shown below:

Claim 1, lines 54 and 56 change "transistor" to --transducer--.

Claim 2, line 1, change "5" to --1--.

Claim 2, Col. 5, line 1, change "valve" to --value--.

Claim 3, line 1, change "5" to --1--.

Signed and sealed this 29th day of May 1973.

(SEAL)
Attest:

EDWARD M. FLETCHER, JR.            ROBERT GOTTSCHALK
Attesting Officer                  Commissioner of Patents